June 2, 1925.

S. L. KNEASS

CHECK VALVE MECHANISM

Filed April 10, 1922    2 Sheets-Sheet 1

1,540,216

WITNESS:
Rob? R. Kitchel.

INVENTOR
Strickland L. Kneass
BY Frank J. Busser
ATTORNEY

June 2, 1925.
S. L. KNEASS
1,540,216
CHECK VALVE MECHANISM
Filed April 10, 1922
2 Sheets-Sheet 2
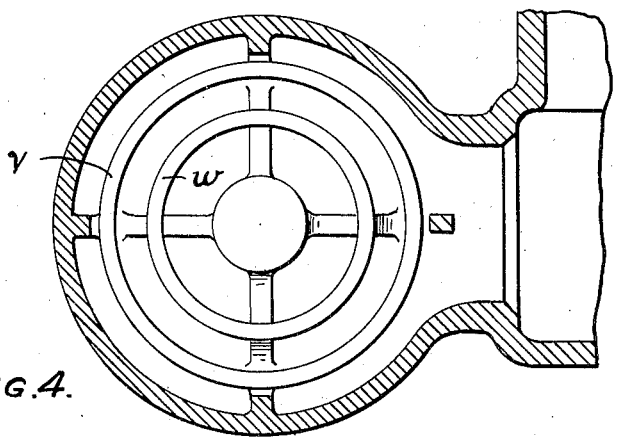
FIG.4.
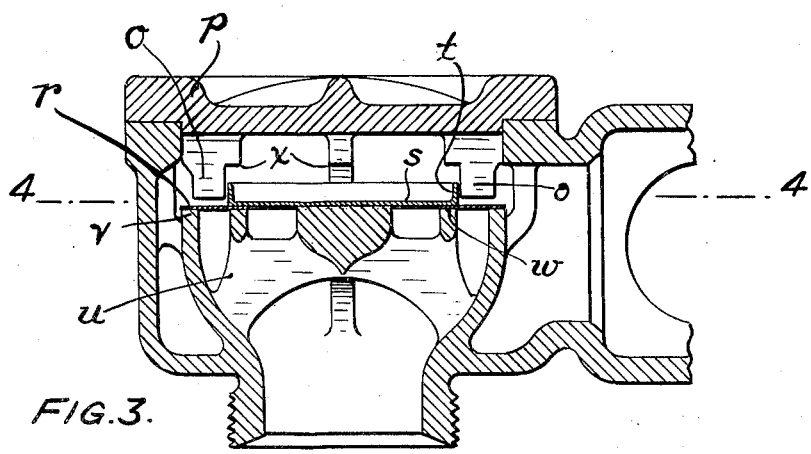
FIG.3.
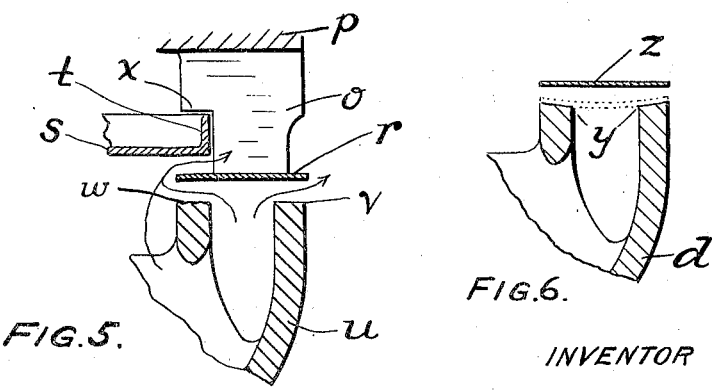
FIG.5.
FIG.6.
INVENTOR
WITNESS:
Rob. R. Mitchell
Strickland L. Kneass
BY
Frank S. Busser
ATTORNEY.

Patented June 2, 1925.

1,540,216

UNITED STATES PATENT OFFICE.

STRICKLAND L. KNEASS, OF PHILADELPHIA, PENNSYLVANIA, ASSIGNOR TO WILLIAM SELLERS & COMPANY, INCORPORATED, OF PHILADELPHIA, PENNSYLVANIA, A CORPORATION OF PENNSYLVANIA.

CHECK-VALVE MECHANISM.

Application filed April 10, 1922. Serial No. 551,091.

*To all whom it may concern:*

Be it known that I, STRICKLAND L. KNEASS, a citizen of the United States, residing at Philadelphia, county of Philadelphia, and State of Pennsylvania, have invented a new and useful Improvement in Check-Valve Mechanism, of which the following is a full, clear, and exact description, reference being had to the accompanying drawings, which form a part of this specification.

My invention relates to valve mechanism for controlling the flow of pressure fluid to a pressure chamber or reservoir, especially where the motion of the entering fluid is intermittent, as, for example, where a pump is used to supply water to a locomotive or stationary boiler. Inasmuch as the pressure in the feed pipe fluctuates between limits above and below the pressure in the boiler or pressure reservoir, a check valve is used to prevent back flow, which check valve moves to and from its seat in response to such pressure fluctuation. This causes wear of parts destructive to the valve and the seat. Merely lessening the lift and increasing the area of the passage may involve an increase of superimposed pressure and weight of valve, yielding little advantage.

One object of my invention is to provide a check valve construction in which the inertia and impact of the valve will be substantially reduced so that there will be minimum wear of both valve and seat.

Another object of my invention is to prevent back flow of fluid from the reservoir or boiler in case it is desired to grind, repair or replace the check valve, thereby securing ease and cheapness of repair.

Embodiments of my invention are shown in the accompanying drawings, in which—

Fig. 3 is a view, similar to Fig. 1, of an alternative construction embodying my invention.

Fig. 4 is a section on the line 4—4 of Fig. 3.

Fig. 5 is an enlarged sectional view of a detail of the structure of Figs. 3 and 4.

Fig. 6 is an enlarged sectional view of a modification of the structure of Figs. 1 and 2.

Figure 2:
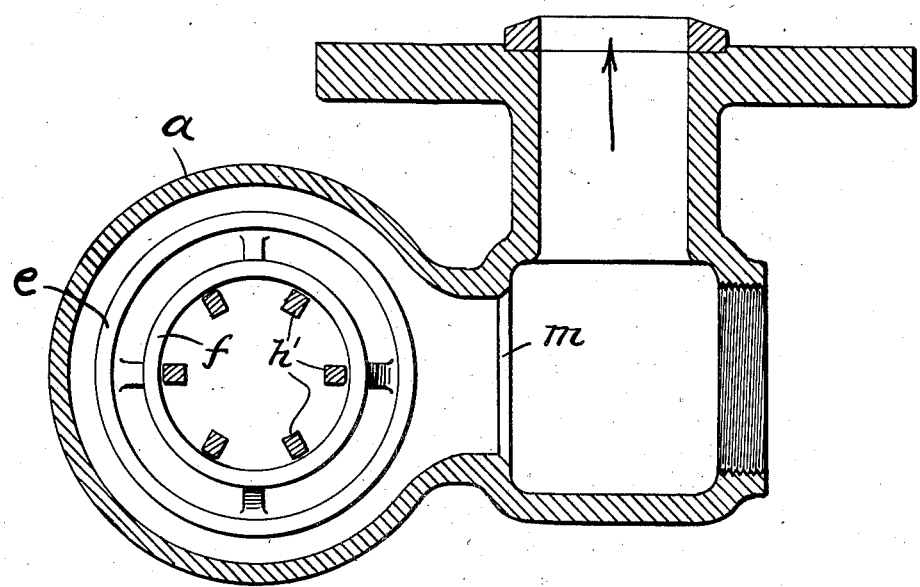
Fig. 2 is a section on the line 2—2 of Fig. 1, with the stop valve removed.
Figure 1:
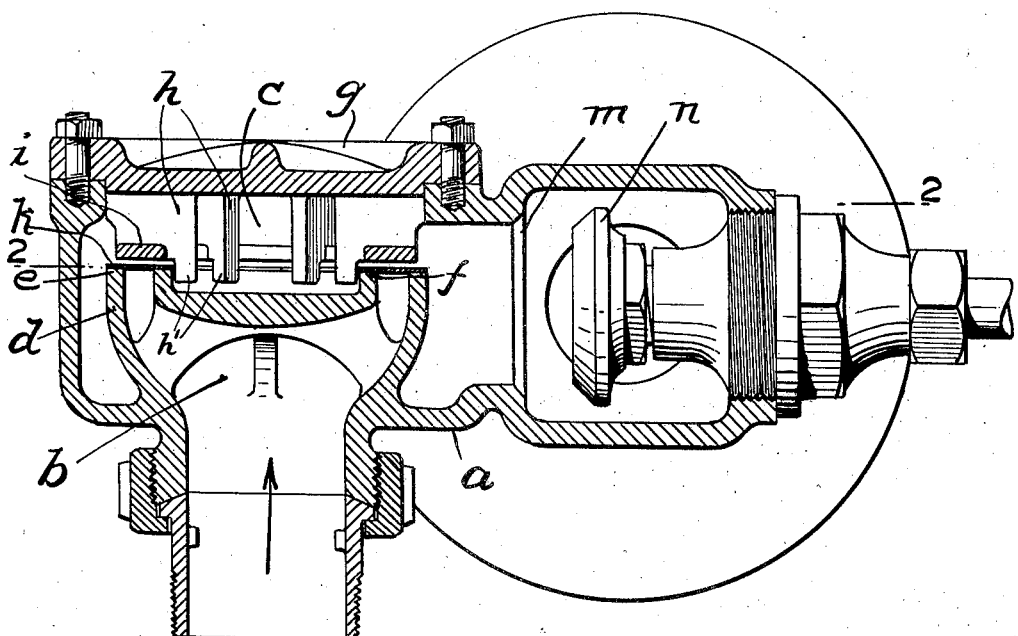
Fig. 1 is a vertical sectional view of simplified valve mechanism embodying my invention.

Referring first to the construction shown in Figs. 1 and 2:

The valve casing $a$ encloses an inlet chamber $b$ (connected with a pump or other pressure fluid supply means) and an outlet chamber $c$ (connected with a boiler or other pressure reservoir). A septum $d$ between the two chambers is provided with two concentric valve seats $e$ and $f$ with an annular opening between them. The removable cover $g$ of the casing $a$ has webs $h$ carrying a ring $i$ extending above, and spaced from, the opening between the outer and inner valve seats $e$ and $f$ and forming a stop limiting the unseating movement of the valve. The webs $h$ are provided with extensions $h'$ which form a guide for the thin, annular, flexible disc-valve $k$.

In the discharge chamber of the valve casing $a$ is a valve seat $m$ and valve $n$, the latter being normally open so as to allow a wholly unrestricted flow of fluid. The body of the valve is threaded in an opening in the discharge chamber $c$ of the casing $a$ and is adapted to be screwed onto its seat so as to completely separate the check valve chamber from the boiler or reservoir.

The area of discharge is determined by a circumference of the discharging passage way under the valve when the valve is lifted and by the lift of the valve. The shorter the lift of a valve, the less its momentum and (with a given weight of valve) the lighter the blow upon its seat. By providing an outer valve seat of maximum practical diameter, the lift of the valve may be reduced to a minimum, thereby so lightening the energy of the blow as to minimize the damaging effect upon the valve seat and upon the valve itself. The blow struck by the valve being a light one, the valve need not be made heavy to withstand the shock, but may be relatively light and thin, and just sufficiently strong to withstand the superimposed pressure and blow when seating.

In my invention I provide two areas of discharge of a single valve by making the valve annular and discharging from under both its inner and outer circumferences and thus obtain the largest area of discharge with a minimum lift; and I use a light valve seating upon inner and outer concentric septums, which owing to strain and stress in service are liable to distortion from their normal alignment and require that the valve be sufficiently thin to provide the flexibility required to seat fluid-tight. If the valve be annular, as shown, it should be sufficiently flexible to seat fluid-tight upon its outer rim as well as upon its inner rim.

Under certain circumstances, it may be advantageous to provide for a fluid-tight seat upon the outer rim only of the annular valve, the construction shown in figs. 3, 4 and 5 may be adopted. In this construction, the unseating movement of the annular disc-valve $r$ is limited by lugs $o$ depending from the removable head $p$. Above the valve $r$ is a flexible circular disc valve $s$ having a circumferential flange $t$ for the purpose of guiding it when lifting from its seat. The septum $u$ is provided with an outer circumferential valve seat $v$, a central seat or stop for the valve $s$ and an intermediate concentric member $w$ corresponding to the valve seat $f$ of Fig. 1, although not necessarily being ground to afford a fluid-tight seat. The upward movement of the valve $r$ is limited by the lugs or stops $o$. The upward movement of the valve $s$ is limited by shoulders $x$ on the lugs $o$, said lugs also forming a guide to maintain valve $s$ in proper alignment. When the pressure on the inlet side exceeds the pressure on the outlet side, the valves $r$ and $s$ are both lifted, affording flow passages under the outer edge of the annular valve $r$ and under the superimposed circular valve $s$, as indicated by arrows in Fig. 5. Upon reversal of pressure, the annular valve $r$ seats fluid-tight against the seat $v$ and the outer rim of the circular valve $s$ seats fluid-tight upon the inner rim of the annular valve.

The construction shown in Figs. 1 and 2 is, by reason of its simplicity, preferable to that shown in Figs. 3, 4 and 5, but may require, under certain pressure conditions and degrees of elasticity and resilience of the valve disc $k$, a slight deviation from the plane surface of the concentric valve seats, due to a possible tendency of the valve disc to bend slightly into a concave shape and when in that shape it seats fluid-tight only against the corners of the valve seats $e$ and $f$ and not absolutely flat against the entire area of the valve seat faces. I have, however, overcome this objection by making the valve seat slightly concave, as shown, much exaggerated, at $y$ in Fig. 6. The disc valve should be of flexible and elastic material with a normal flat contour, as shown in full lines at $z$, Fig. 6, and adapted, upon seating, to yield or flex sufficiently to conform to its seat, as shown in dotted lines.

Not only does the lightness of the blow upon seating reduce the wear upon valve and seat that causes upsetting of the material, but it avoids or materially reduces the damage arising from particles of foreign matter being caught between the two surfaces at the time of seating. With a heavy valve having a substantial lift and which seats with a heavy blow, especially when the feed is supplied to the reservoir intermittently, as by a pump, such foreign material so caught is, by reason of the heavy blow aforesaid, driven into the seating surface of the valve, with consequent damage causing fluid leakage. With a valve embodying my invention, having both a minimum weight and a minimum lift, the energy of the blow is reduced to a minimum and such foreign matter is not driven into the material; but during the next flow of fluid under the valve, the foreign material is washed away and the valve surfaces remain undamaged and fluid-tight.

Having now fully described my invention, what I claim and desire to protect by Letters Patent is:

1. A valve mechanism interposed between a source of pressure fluid supply and a pressure fluid reservoir comprising a valve-body, a septum dividing the body into inlet and outlet chambers and provided with an annular opening circumscribed by concentric raised seats, and a light resilient annular valve, said valve adapted to flex under superimposed pressure to conform to said seats and bear on the surfaces thereof.

2. A valve mechanism interposed between a source of pressure fluid supply and a pressure fluid reservoir comprising a valve casing, a septum dividing the casing into an inlet chamber and an outlet chamber, a light disc-like flexible annular valve, a light disc-like flexible circular valve of smaller diameter than the annular valve and positioned above and adapted to seat thereon, said septum having a plurality of concentric faces affording a seat for said annular valve, and means adapted to limit the lift of said valves respectively.

3. A valve mechanism interposed between a source of pressure fluid supply and a pressure fluid reservoir comprising a valve casing, a septum dividing the casing into an inlet chamber and an outlet chamber, a light disc-like flexible annular valve, a light disc-like flexible circular valve of smaller diameter than the annular valve and positioned above and adapted to seat thereon, said septum having a plurality of concentric faces affording a seat for said annular valve, means adapted to limit the lift of said valves, said circular valve being allowed a greater lift than said annular valve.

4. Valve mechanism interposed between a source of pressure fluid supply and a pressure fluid reservoir comprising a valve casing, a septum dividing the casing into an inlet chamber and an outlet chamber and having a plurality of concentric faces limiting the downward movement of the valve, a light disc-like flexible annular valve, spaced-apart stops above and relatively close to the valve when seated so as to substantially restrict the lift of the valve, a light disc-like flexible circular valve above, and of smaller diameter than, the annular valve, and means limiting the lift of the second valve but permitting a greater lift than the lift of the first valve, the second valve adapted to seat upon the inner rim of the first valve.

5. A valve mechanism interposed between a source of pressure fluid supply and a pressure fluid reservoir comprising a valve body, a septum dividing the body into inlet and outlet chambers and provided with an annular opening circumscribed by concentric raised seats, a light resilient annular valve having a flow passage through the body thereof, whereby the fluid can flow from the inlet to the outlet chamber over both seats, and spaced guides for the valve having flow channels therebetween, said valve adapted to flex under superimposed pressure to conform to said seats and bear on the surface thereof.

In testimony of which invention, I have hereunto set my hand, at Philadelphia, Pa., on this 5th day of April, 1922.

STRICKLAND L. KNEASS.